April 10, 1951 W. M. NEAL 2,548,510
METHOD FOR TREATMENT OF FRUIT WASTES
Filed Aug. 13, 1935
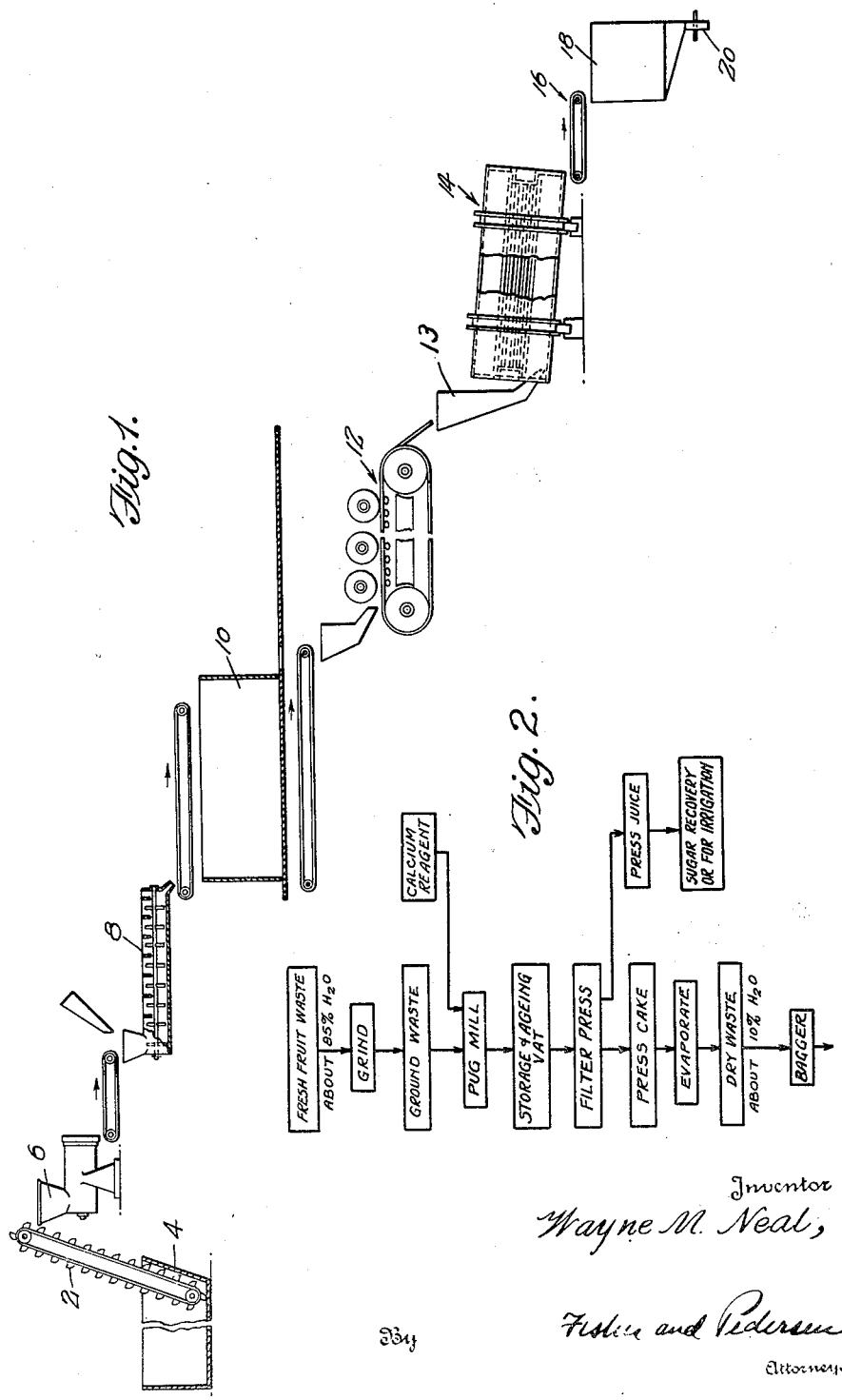

Patented Apr. 10, 1951

2,548,510

UNITED STATES PATENT OFFICE 2,548,510

METHOD FOR TREATMENT OF FRUIT WASTES

Wayne M. Neal, Gainesville, Fla., assignor, by Decree of Court, to the State of Florida, The State Board of Education of Florida, and State Board of Control Application August 13, 1935, Serial No. 36,035

11 Claims. (Cl. 99—2)

This invention relates to a method for the treatment of fruit waste and for the recovery of values therefrom. More particularly the invention relates to a method for the treatment of fruite waste, such as cannery waste, or culls, to produce a dried mass suitable for stock feed without the necessity of evaporation of the entire moisture content thereof as has heretofore been employed in the preparation of cattle feed from such material.

One of the primary objects of the invention is to provide a method for the removal of a portion of the water held by the fruit waste without evaporating the said portion, so as to reduce the cost of drying such waste.

Another object of the invention is to provide a method by which water may be removed from fruit waste, such as citrus cannery waste by which the tendency of the material to adhere to the drying equipment is greatly lessened and by which "burning on" or sticking may be substantially eliminated.

Another object of the invention is to provide a method of treatment of fruit waste containing pectic constituents or colloidal material by which "case hardening" or the external hardening of masses of the material so as to enclose a soggy or wet interior may be avoided.

Another object of the invention is to provide a method by which the feed value of the fruit waste may be considerably increased and by which an essential and nutritious ingredient may be incorporated into the said fruit waste in the making of the live stock feed by the use of a material which assists in agglomerating the colloid particles which otherwise bind or occlude the water in the mass.

With these and other objects in view the invention comprises the various steps and features hereinafter more fully described and defined in the claims.

Fruit waste, such as citrus cannery waste, which comprises the residue from the canning of juice or fruit hearts, consists mainly of peel, that is, the outside skin; rag, that is the material between the skin and the juice sac; and the seed of the fruit. This waste material, if allowed to be thrown into dumps, becomes a nuisance because of the malodorous gases evolved during decomposition. The laws of most municipalities prohibit the dumping of such materials and require disposal without creating a nuisance, which may be accomplished by incineration; or by transporting it to some place outside of the municipal jurisdiction, or by treatment to produce a stock feed. Such dried waste material may be treated and employed as a live stock feed because of the cheapness and food value of the material.

The usual water content of such fresh citrus cannery waste is approximately 85%. Heretofore it has been attempted to filter press this material as described in the patent to Lewis No. 1,973,084 in order to abstract a proportion of the water content thereof, but the amount of water eliminated is extremely low and the cost of handling the material in this manner renders this method substantially prohibitive. Furthermore, in the use of this method the moisture is held by the hydrophillic colloids present and cannot be pressed out by the ordinary filter-pressing or centrifuging.

The present invention is based upon the discovery that by treatment of such citrus cannery waste, or other fruit waste, including the peels, rag and such material containing colloids and pectin or pectic constituents, with a suitable reagent the colloidal and pectin constituents are agglomerated or coagulated in such a way that a large proportion of the water content may be readily removed by filter pressing or even by ordinary filtration by the use of bag filters, although the best results are obtained by the use of the filter press in which a considerable amount of pressure may be applied to accelerate the filtration process.

The reagent which I have found to be most suitable in the application of my method is calcium hydroxide, although calcium carbonate and calcium oxide may serve to effectively cause the said agglomeration or reaction of breaking down the colloidal structure which tends to hold the moisture in a bound form.

After the part of the moisture which is removable by filtration, which constitutes about 67% of the mass treated, has been withdrawn or removed from the material under treatment, the remaining mass is subjected to a drying operation, preferably by the use of heat, as by passing the material through a rotary steam tube dryer by which the material passes continuously through the drum and is progressively dried.

The preferred method of carrying out the invention is illustrated in connection with the accompanying drawing in which:

Figure 1 illustrates more or less diagrammatically the form of apparatus required in carrying out the method steps of the invention; and Figure 2 is a flow chart showing the main steps involved in the method.

Referring in detail to the drawing, numeral 2 designates an elevator which feeds from the storage bin 4, containing the fruit cannery waste or culls, the elevator serving to transport the fruit waste to be treated to a suitable form of grinder or cutting device 6. As the material treated contains considerable quantities or lumps of rag, skin, and other materials to be subdivided, it is preferable to employ a form of cutter having a screw feed and a series of rotating knives operating upon a perforated plate and forcing the comminuted material therethrough.

From the grinding device the comminuted material is fed to a pug mill 8 in which the reagent to be employed is added. The amount of reagent to be employed in the treatment of the fruit waste depends upon the specific character of the waste, although for the ordinary citrus cannery waste I preferably employ about six pounds of calcium hydroxide per ton of the material treated. After the reagent has been added, the combined mass is agitated in the pug mill in order to obtain a homogeneous admixture and to cause the agglomerating reaction upon the colloids and pectic constituents of the mass by which the material is altered in its power of occluding or holding moisture in the bound state to such an extent that the water may be easily evaporated therefrom without the formation of balls or "case hardened" masses which bind or hold the water. A portion may also readily be removed by simple filtration or centrifuging, as above explained.

From the pug mill the treated material is passed to a storage vat 10 in which it is allowed to stand or age from two to three hours, although if desired it may be permitted to age or react for a considerably longer period of time as may be desired, as overnight, for example.

After the reagent has acted on the material in the storage vat it is in such a condition that if a mass is picked up in the hand it may readily be pressed so as to agglomerate the solid matter, by squeezing out or extruding the water or moisture content to a very considerable degree.

In order to extract the mechanically removable portion of the water content at this stage, the mass may be passed from a storage vat to a hydraulic press or filter press 12 by which the said removable portion is pressed out. It will be understood that if desired a centrifuge may be used for this portion of the operation, or a vacuum filter, or an ordinary bag filter may be employed in connection with certain installations if found to be preferable.

The material which has been treated in the process and which originally contained about 85% of moisture together with 15% of solid material is agglomerated and separated from the mechanically removable water so that the filter pressed mass contains 70% or even less moisture. It will be obvious that the amount of water removed depends upon the condition of the material treated and the length of time of treatment in the storage vat and filter press.

The form of filter press indicated in the drawings is of the continuous type so that the press juice and the press cake are continuously removed in the process. The press juice which is removed from the solid material may be treated if desired to obtain sugars and other constituents therefrom, or the juice may be utilized for irrigation purposes for other uses, or the said juice may, if desired, be conducted off to waste.

The press cake which is separated in the filter press contains generally from 60 to 70 percent of moisture and must be further treated to reduce the moisture content to a suitable amount, preferably to a content of about 10% of moisture in a stock feed product. The press cake from the filter press is conducted by any suitable form of conveyor 13 to any suitable form of drier or evaporator, such as a drum drier 14 in which the moisture is evaporated, and it is reduced to the desired state of dryness or moisture content.

From the drier 14 the dried material is passed by means of a conveyor 16 to storage or to a bagger 18 from which the dried product may be withdrawn into bags or suitable containers through the outlet pipe 20.

In Fig. 2 of the drawings the various method steps are indicated in the preferred sequence of operation. It will be understood, however, that the method may be modified, as will be apparent to those skilled in the art without departing from the invention as hereinafter defined in the claims. It will be apparent that the method is applicable to fruits other than citrus fruits, including grape fruit, oranges, lemons, etc. The method may be used, for example, in connection with grapes and apples, or for the treatment of substantially any material containing colloids, particularly in the presence of pectin and having a water content in excess of 60%, from which moisture, otherwise bound by the colloids, is to be removed.

In carrying out the method of my invention by treatment of the fruit waste with the calcium compound or reagent to modify the physical conditions of the material, it is obviously preferable to remove the major portion of the water mechanically by means of a filter press but it will be apparent, however, that under certain conditions, particularly where it is desired to retain the full protein content of the material in the mass, it is not essential to remove water mechanically but the whole mass may be subjected to evaporation in the drier 14. By treatment in this manner the superheating and the "case hardening" of the waste material does not take place and the water may be evaporated at the usual boiling temperatures under atmospheric pressure. It will be understood, however, that in the preferred method of carrying out my invention the moisture content in excess of above 60% of moisture is removed mechanically in the manner above described.

In the treatment of citrus cannery waste, for example, the water content may under the optimum conditions be reduced in the filtration step from about 85% to 60% of moisture. The remaining amount of moisture in the material, that is the amount of moisture in the material having substantially 60% of moisture may then be evaporated to produce a product having approximately 10% of moisture.

As an example of the method of carrying out the invention, if 18,000 pounds of the waste cannery material containing approximately 85% of moisture and 15% of dry matter is treated with a calcium compound or reagent, the water content above about 60% in most cases may be readily removed. If the treated product is filtered to mechanically remove the water, an intermediate product may be obtained having about 70% of water for example whereby 12,000 pounds of press juice must be removed. This press juice consists of approximately 900 pounds of dry matter, which is in solution or suspension, and about 11,000 pounds of water. By the removal of this press juice from the mass, approximately 6000 pounds of press cake remains, which press cake contains about 4200 pounds of water and 1800 pounds of dry matter, so that by evaporating the 6000 pounds of pressed cake in the usual way to a dried product containing about 10% of moisture, this will produce about 2000 pounds of the dried final product.

In comparing the process of my invention with the process in which all the water is removed by evaporation, in which process very little of the solid matter is lost, it may be stated that it would be necessary to start with only 12,000 pounds of the original fruit waste containing about 85% of water and that by evaporating 10,000 pounds of of the water content, 200 pounds of a product containing 10% of moisture would be obtained.

In the changing of the physical condition by chemical treatment as above described, permitting the removal of water mechanically without resorting to evaporation, the saving in fuel or evaporation costs will be apparent from the following:

Assuming that a fruit waste material containing 90% of water is to be treated it would require treatment of 18,000 pounds of the material in order to obtain one ton or 2,000 pounds of dried stock feed containing 10% of moisture. This material contains substantially 16,000 pounds of water. In order to reduce this material to a product having 85% of moisture it is necessary to remove 6,000 pounds of water whereby the resulting product weighs 12,000 pounds and contains 10,200 pounds of water. In order to reduce this material to a product containing 80% of water which corresponds to a weight of 9,000 pounds, it is necessary to remove 3,000 pounds of water and the resulting product (80% water) contains 7,200 pounds of water. In order to reduce the 9,000 pounds of the mass containing 80% of water to a product containing 75% of water, 1,800 pounds of water must be removed whereby the resulting product weighs 7,200 and contains 5,400 pounds of water. If this product is now to be reduced to one having 70% of water which corresponds to a weight of 6,000 pounds of the product it is necessary to remove 1,200 pounds of water and the final product contains 4,200 pounds of water. To carry the process further, if this product is then to be reduced in moisture content by an additional 5% to produce a product containing 65% of water which corresponds to a weight of 5,143 pounds of the product it is necessary to evaporate or remove 857 pounds of water so that the product contains 3,343 pounds of water. To further reduce the moisture content to one containing 60% of water which corresponds to a weight of 4,500 pounds of the product, assuming that this material is produced directly from 18,000 pounds of the material containing 90% of water, it is necessary to abstract or remove 643 pounds of water and the 60% moisture product now contains 2,700 pounds of water.

Under practical operating conditions it is unprofitable to attempt further moisture reduction by mechanical means but it will be understood that the material is in such a physical condition due to the treatment as above described that the water may be readily removed by ordinary evaporation without the concomitant local superheating and miniature explosions due to sudden release of steam. Furthermore, the mass from which the major portion of the moisture has been mechanically removed, does not act to form masses or balls of material which become "case hardened" and enclose or entrap water which cannot be removed by evaporation but the mass remains substantially homogeneous so that the water is progressively evaporated and released during the evaporation process.

The preferred method of my invention in which a portion of the water content is removed mechanically presents certain advantages which are not obtained by direct evaporation of the moisture content.

In the use of a calcium compound as calcium hydroxide, for example, which is added to the fruit waste as above described, this material reduces the stickiness of the waste so that it is handled much more easily in the drier 14, regardless of whether or not it is pressed.

Furthermore, in accordance with the method as described, the breaking of the gel structure imparts a more fibrous texture to the product so that the material is rendered in a physical condition in which the moisture or water is more readily removed by evaporation when the waste material is subjected to heat. In other words, the breaking down of the colloid structure holding water in the bound state, or the agglomeration of the colloid material, substantially eliminates the "case hardening" which would otherwise occur in the material, and the superheating of portions of the mass, which is associated with sudden releasing of entrapped steam or superheated water, is avoided.

Furthermore, the calcium compounds which are introduced into the material to produce the coagulation or the agglomeration of the colloid material to permit removal of water by mechanical means gives an added nutritional value to the feed material produced.

Untreated citrus wastes are inherently acidic in reaction and slimy in character. When they are treated with a reagent, in accordance with this invention, a reaction occurs during which the physical properties of the waste are changed from an unpressable to a pressable condition. The precise nature of this reaction is not known to have been fully and unmistakably determined. One theory, advanced to explain it, is: that the reaction is characterized first by the formation of a gel and second by the reversion of the gel to a watery liquid; that the formation of the gel is promoted by the initial decrease in the acidity, or in what may be termed the superficial alkalinity, of the solution, occasioned by the introduction of the reagent; and that the reversion of the gel is caused by acids which are released during the formation of the gel and possibly augmented by unneutralized acids contained in the original waste.

Untreated citrus wastes are inherently bitter in taste or flavor. This bitterness is known to be occasioned, in part at least, by naringin. It may be augmented by other glucosides and their derivatives including naringenin, hesperedin, and possibly some homologs thereof. When citrus waste is treated, in accordance with this invention, the bitter taste is supplanted by a mildly sweet taste. The precise reason for this change has not been unmistakably determined. One theory, advanced to explain it, is that naringin is, and the other bitter tasting ingredients of the waste are, chemically broken down by the alkaline reagent and thereby resolved into sweet tasting, water soluble, phloroglucin and an acid.

It will be understood that while the product which is produced as a result of the method above described contains about 10% of moisture, the moisture content may run as high as 15% without causing spontaneous deterioration of the product. It will be understood, however, that for the ordinary uses I prefer to limit the moisture content to substantially 10% in the final product.

It is to be understood that while the invention has been described in its preferred form, various modifications or changes may be made without departing from the spirit or scope of the invention as defined in the claims.

Having thus described the invention, what is claimed as new is:

1. A method for the prevention of "balling" or "case hardening" during evaporation of water from citrous fruit waste containing colloidal constituents which comprises grinding the fruit waste material to suitably comminute the same, adding to the ground material a reactive non-toxic calcium compound to break up the gel structure of said constituents, aging the resulting mass to agglomerate colloidal constituents thereof, mechanically removing water from the mass and evaporating remaining moisture in the mass by means of heat to obtain a product having less than 15% of moisture.

2. A method for the treatment of fruit waste material which comprises grinding fruit waste material, mixing a non-toxic calcium reagent with the said material, ageing the resulting mixture, removing water therefrom and evaporating the remaining material.

3. A method for the treatment of fruit waste which comprises grinding the said fruit waste, adding a non-toxic, alkaline calcium compound to said fruit waste, mixing and agitating the resulting admixture, ageing the admixture to secure maximum effect in permitting the mechanical removal of water therefrom, removing water from the admixture and drying the remaining mass to provide a product having not more than 15% moisture.

4. A method for the treatment of fruit waste, which comprises treating a mass of fruit waste containing upwards of 60% moisture with a reactive non-toxic calcium compound, agitating the material and permitting the said compound to react for a sufficient time on the said mass to agglomerate the solids, removing the major portion of the water from the mass without heat and thereafter drying the mass.

5. A method for the treatment of fruit waste, which comprises treating a mass of fruit waste containing upwards of 60% moisture with a reactive non-toxic calcium compound, permitting the said compound to react on the colloids and pectic constituents thereof to agglomerate the same, thereby freeing bound water so as to permit mechanical removal thereof from the mass, removing the major portion of the water in excess of the said 60% moisture by filtration and drying the remaining mass.

6. A method for the treatment of fruit waste, which comprises treating a mass of fruit waste containing upwards of 60% moisture with a reagent containing at least one member of the group consisting of calcium oxide, calcium hydroxide, calcium carbonate, permitting the said reagent to react for a sufficient time on the said mass to agglomerate the colloidal material thereof, filtering the major portion of the moisture from the mass so as to contain not substantially more than about 60% of moisture and evaporating remaining moisture from the mass to obtain a dried product containing not substantially more than 10% of moisture.

7. A method for the treatment of fruit cannery waste which comprises treating a mass of fruit cannery waste containing about 85% of moisture and about 15% of solids with a calcium reagent selected from a group consisting of calcium oxide, calcium hydroxide, calcium carbonate, ageing the mass to agglomerate the colloidal or pectic constituents of the mass, thereby permitting mechanical removal of water from the mass and preventing "balling" thereof, removing moisture from the mass by filter pressing to produce a product containing not more than 75% of moisture and drying the remaining mass by evaporation of moisture therefrom to obtain a product having not more than 15% of moisture.

8. A method for the treatment of fruit waste which comprises grinding a mass of cannery fruit waste containing substantially 85% of moisture to suitably comminute the same, agitating the ground mass and adding calcium hydroxide thereto in the ratio of about 54 pounds of the calcium hydroxide to 18,000 pounds of the fruit waste, ageing the resulting mass for at least several hours, thereafter filter pressing the mass and drawing off the press juice until the resulting press cake contains not substantially more than 70% of moisture and drying the press cake to provide a product having not more than 15% of moisture.

9. A method for the treatment of citrus fruit waste material which comprises grinding the fruit waste material, mixing a non-toxic calcium reagent with the said material, ageing the resulting mixture, removing water therefrom and evaporating the remaining material.

10. A method for the treatment of citrus fruit waste material for use as stock feed which comprises grinding the fruit waste material, mixing a non-toxic calcium re-agent with the said material to form a gel, and breaking said gel, ageing the resulting mixture, removing water therefrom and evaporating the water from the remaining material.

11. A method for the treatment of citrus fruit waste material for use as stock feed which comprises grinding the fruit waste material, mixing a non-toxic calcium re-agent in controlled amounts with the said material to form a gel, and breaking said gel, ageing the resulting mixture, removing water therefrom and evaporating the water from the remaining material.

WAYNE M. NEAL.

REFERENCES CITED

The following references are of record in the file of this patent:

UNITED STATES PATENTS

| Number | Name | Date |
| --- | --- | --- |
| 1,700,608 | Brune | Jan. 29, 1929 |
| 1,911,282 | Moreton | May 30, 1933 |
| 1,973,084 | Lewis | Sept. 11, 1934 |
| 1,975,998 | Wilson | Oct. 9, 1934 |
| 1,991,242 | Cole et al. | Feb. 12, 1935 |

FOREIGN PATENTS

| Number | Country | Date |
| --- | --- | --- |
| 188,867 | Great Britain | Nov. 23, 1922 |